(12) United States Patent  
Caskey et al.

(10) Patent No.: US 8,805,672 B2  
(45) Date of Patent: Aug. 12, 2014

(54) TRANSLATION CACHE PREDICTION

(75) Inventors: Sasha P. Caskey, New York, NY (US); Sameer Maskey, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 13/172,950

(22) Filed: Jun. 30, 2011

(65) Prior Publication Data

US 2013/0007405 A1    Jan. 3, 2013

(51) Int. Cl.  
*G06F 17/28* (2006.01)

(52) U.S. Cl.  
USPC .................................. 704/7; 704/2

(58) Field of Classification Search  
USPC .................................. 704/2, 7, 8  
See application file for complete search history.

(56) References Cited

U.S. PATENT DOCUMENTS

| | | |
|---|---|---|
| 6,026,474 A | 2/2000 | Carter et al. |
| 6,131,082 A | 10/2000 | Hargrave, III et al. |
| 6,535,842 B1 | 3/2003 | Roche et al. |
| 2003/0140316 A1* | 7/2003 | Lakritz ........................ 715/536 |
| 2008/0059152 A1 | 3/2008 | Fridman et al. |
| 2008/0098001 A1 | 4/2008 | Gupta et al. |
| 2008/0120090 A1* | 5/2008 | Schurig ........................... 704/2 |
| 2008/0262828 A1* | 10/2008 | Och et al. ........................ 704/3 |
| 2008/0320151 A1 | 12/2008 | McCanne et al. |
| 2010/0088695 A1 | 4/2010 | Karinari et al. |
| 2010/0274923 A1 | 10/2010 | Dean |
| 2012/0303354 A1* | 11/2012 | Schurig ........................... 704/2 |

OTHER PUBLICATIONS

Rabinovich et al., Web Caching and Replication, SIGMOD Record, vol. 32, No. 4, Dec. 2003.

* cited by examiner

*Primary Examiner* — Angela A Armstrong  
(74) *Attorney, Agent, or Firm* — Ryan, Mason & Lewis, LLP

(57) ABSTRACT

Techniques for client side translation cache prediction are provided. The techniques include obtaining meta data associated with a request, applying a cache prediction model to the meta data to automatically predict one or more translations associated with the request, and storing the one or more translations in a client translation cache.

25 Claims, 6 Drawing Sheets

US 8,805,672 B2

TRANSLATION CACHE PREDICTION

FIELD OF THE INVENTION

Embodiments of the invention generally relate to information technology, and, more particularly, to cache management.

BACKGROUND OF THE INVENTION

Currently, translation systems written for client side applications (for example, web clients) send all content to a server for translation. The servers perform the translation and send the translated words/phrases/sentences back to the client for display. Existing approaches for improving the translation speed include keeping an index table in the server containing the most frequent sentences that are requested for translation by web client users. However, a need exists to improve speed and accuracy of machine translation (MT) services provided over the web and/or a network.

SUMMARY OF THE INVENTION

Principles and embodiments of the invention provide techniques for translation cache prediction. An exemplary method (which may be computer-implemented) for client side translation cache prediction, according to one aspect of the invention, can include steps of obtaining meta data associated with a request, applying a cache prediction model to the meta data to automatically predict one or more translations associated with the request, and storing the one or more translations in a client translation cache.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include client side translation cache prediction to improve speed and accuracy of machine translation (MT) services. One or more embodiments of the invention include automated prediction and dynamic modification of user/server cache based on user behavior. Accordingly, the techniques can include automatically predicting possible translations that will be requested and caching them in the web client user instead of the server. Having a translation cache on the client can provide higher translation speed, better robustness to data network coverage, and increased use of services. Further, this allows a user to dynamically modify the translation cache and improve prediction accuracy.

In one or more embodiments of the invention, the meta data associated with an initial request is examined in order to predict the client side translation cache. The meta data can include content for translation, location, network path, user information, last request, language, etc. Also, the meta data information is used to automatically predict the topic of translation in which the user is interested. This facilitates a determination of the most frequently requested translations by all users in the given topic.

Accordingly, the most common translations (source and target) can be transmitted to the client side and stored in the client machine. If the next request matches the source side of the cache, the translation service will redirect the output from the cache instead of making a request to the server. Such techniques, for example, significantly reduce the load on backend translation systems as well as produce higher quality translations at higher speeds.

As detailed herein, translation segments can include words, phrases or other colloquial terms. Additionally, in one or more embodiments of the invention, the client side translation cache is dynamically updated, and the updates can occur at different granularities (phrases, names, etc.). User-specific metadata can be used for building a translation cache and for performing personalization through various methods. Such methods can include, for example topic modeling, user modeling (user information), segment modeling, and content modeling (type of content user is translating (words, names, sentences, etc.)).

Figure 1:
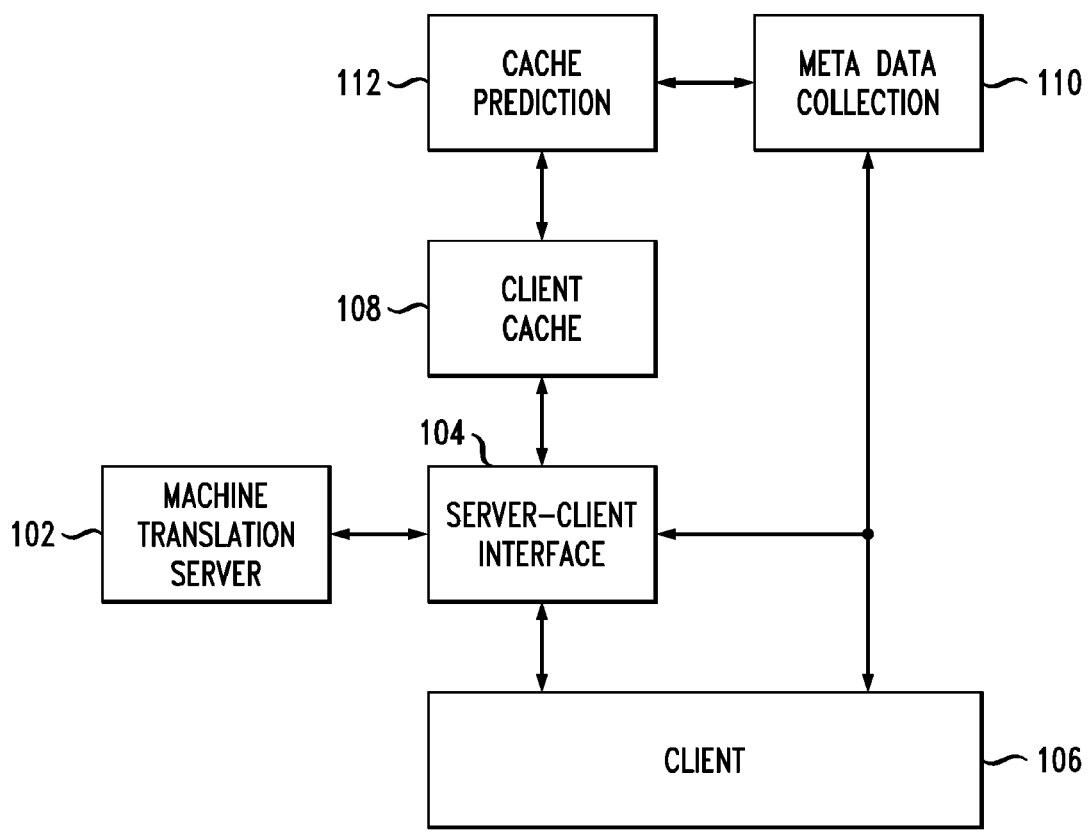
FIG. 1 is a diagram illustrating a client-server design of a machine translation pipeline, according to an embodiment of the present invention.

FIG. 1 is a diagram illustrating a client-server design of a machine translation pipeline, according to an embodiment of the present invention. By way of illustration, FIG. 1 depicts a machine translation server 102, a server-client interface 104, a client component 106, a client cache 108, a meta data collection component 110 and a cache prediction component 112. As shown in FIG. 1, one or more embodiments of the invention include using server-client interface module 104 for all translations. This module will check if a translation request is already in the cache 108. If the query is found, the translation request is not forwarded to the translation server. Instead, the translation is obtained efficiently from the translation cache index. Additionally, meta data collection component 110 collects information from client component 106 and server-client interface 104, which are used by cache prediction component 112 to decide the entries to be added to the client cache 108.

Figure 2:
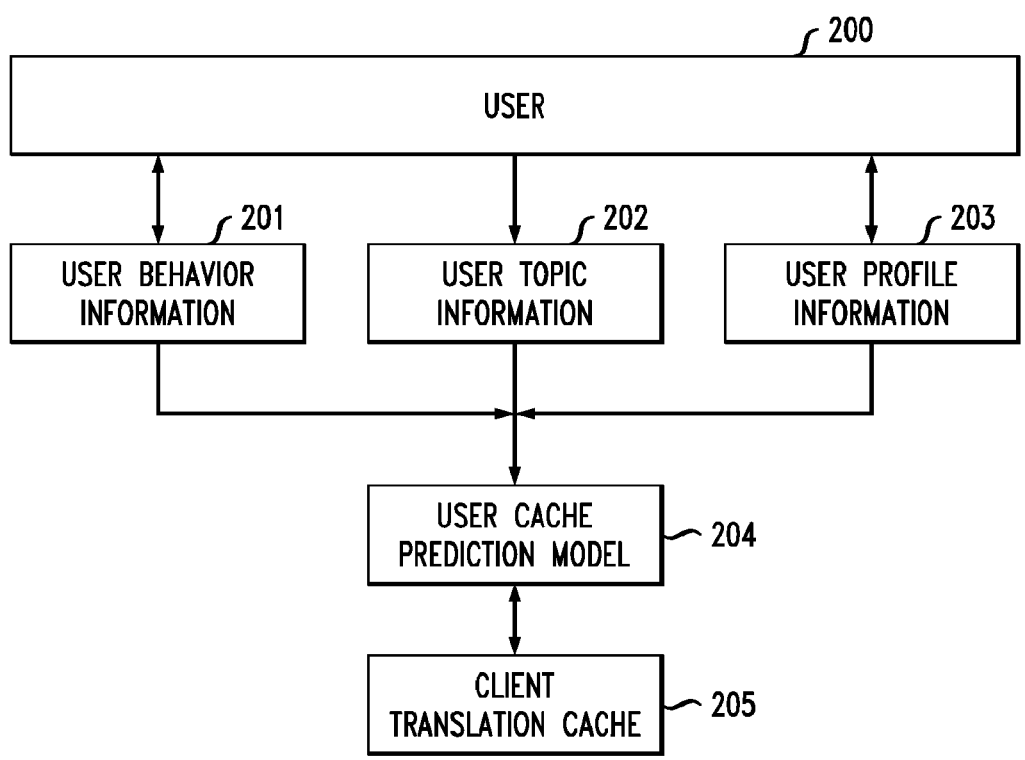
FIG. 2 is a diagram illustrating meta-data collection and analysis, according to an embodiment of the present invention.

FIG. 2 is a diagram illustrating meta-data collection and analysis, according to an embodiment of the present invention. By way of illustration, FIG. 2 depicts a user component 200, a user behavior information component 201, a user topic information component 202, a user profile information component 203, a user cache prediction model component 204 and a client translation cache component 205. FIG. 2 depicts how one or more embodiments of the invention collect meta-data that will adapt the cache. As illustrated, there are interactions between user component 200 and the information components 201, 202 and 203 to generate the relevant information, which is then provided to the user cache prediction model component 204. Such a model is then used to generate translations that are stored in the client translation cache component 205. Accordingly, one or more embodiments of the invention include dynamic adaptation of cache based on meta-information of the user and his/her requests.

Figure 3:
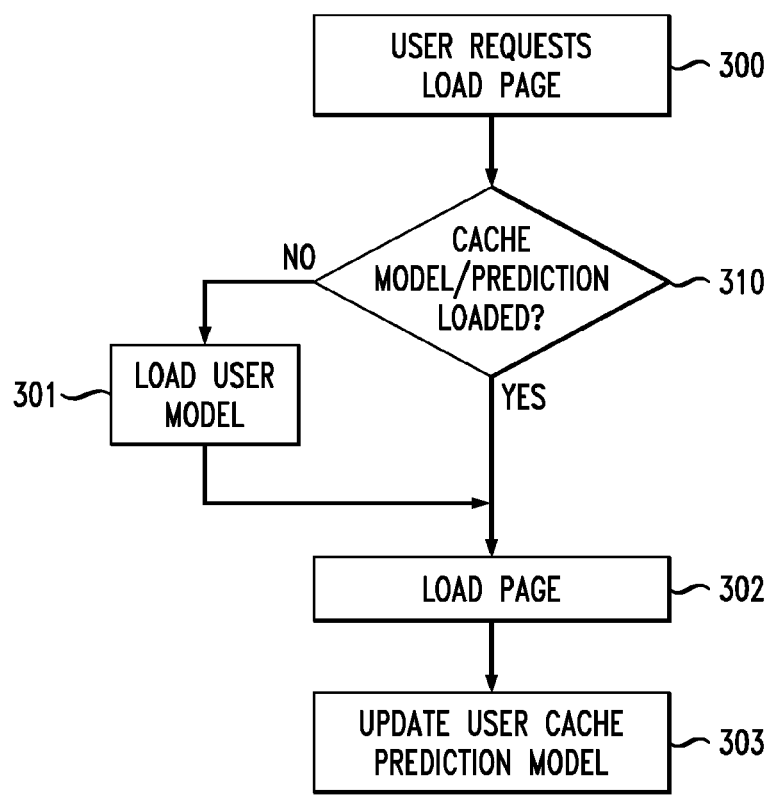
FIG. 3 is a diagram illustrating a cache prediction flow, according to an embodiment of the present invention.
Figure 4:
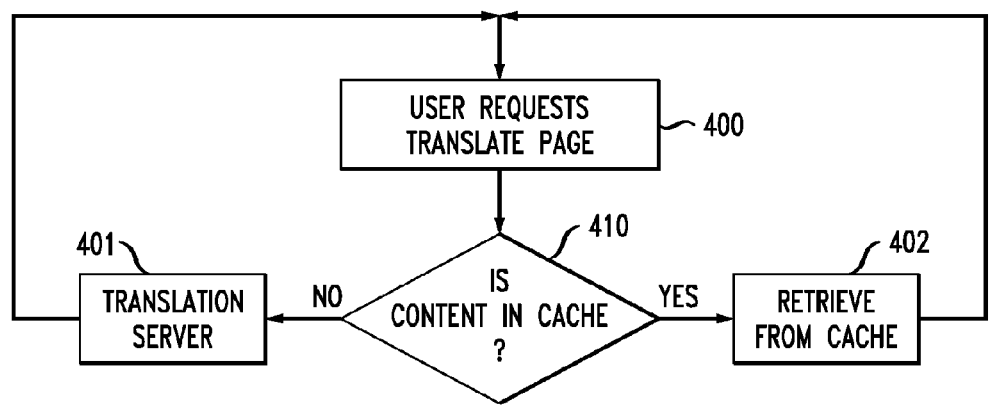
FIG. 4 is a diagram illustrating a cache usage flow, according to an embodiment of the present invention.

FIG. 3 and FIG. 4 illustrate an overall flow diagram for the use of cache. FIG. 3 is a diagram illustrating a cache prediction flow, according to an embodiment of the present invention. In step 300, a user requests a page load. Step 310 includes determining if a cache model and/or prediction has loaded. If no, step 301 includes loading a user model. Otherwise, step 302 includes loading the page and step 303 includes updating the user cache prediction model.

FIG. 4 is a diagram illustrating a cache usage flow, according to an embodiment of the present invention. Step 400 includes a user requesting a page translation. Step 410 includes determining if the content is in the cache. If no, step 401 includes activating the translation server. If yes, however, then step 402 includes retrieving the content from the cache.

Figure 5:
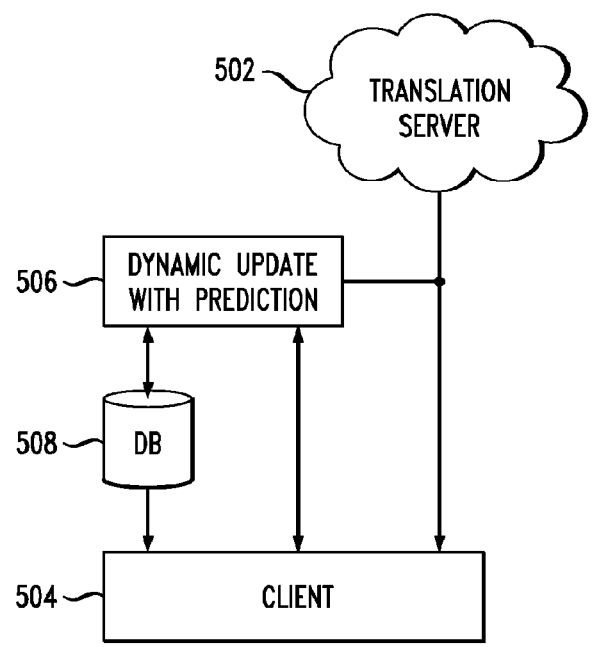
FIG. 5 is a diagram illustrating example architecture, according to an embodiment of the present invention.

FIG. 5 is a diagram illustrating example architecture, according to an embodiment of the present invention. By way of illustration, FIG. 5 depicts a translation server 502, a client component 504, a dynamic update component (for updating with predictions) 506 and a database 508. As depicted, the client component 504 receives data from the translation server 502 and the client cache which is updated by the dynamic cache prediction component 506. The dynamic cache prediction component 506 takes information from the client component 504 and the state of database 508 to further update the cache database 508.

Figure 6:
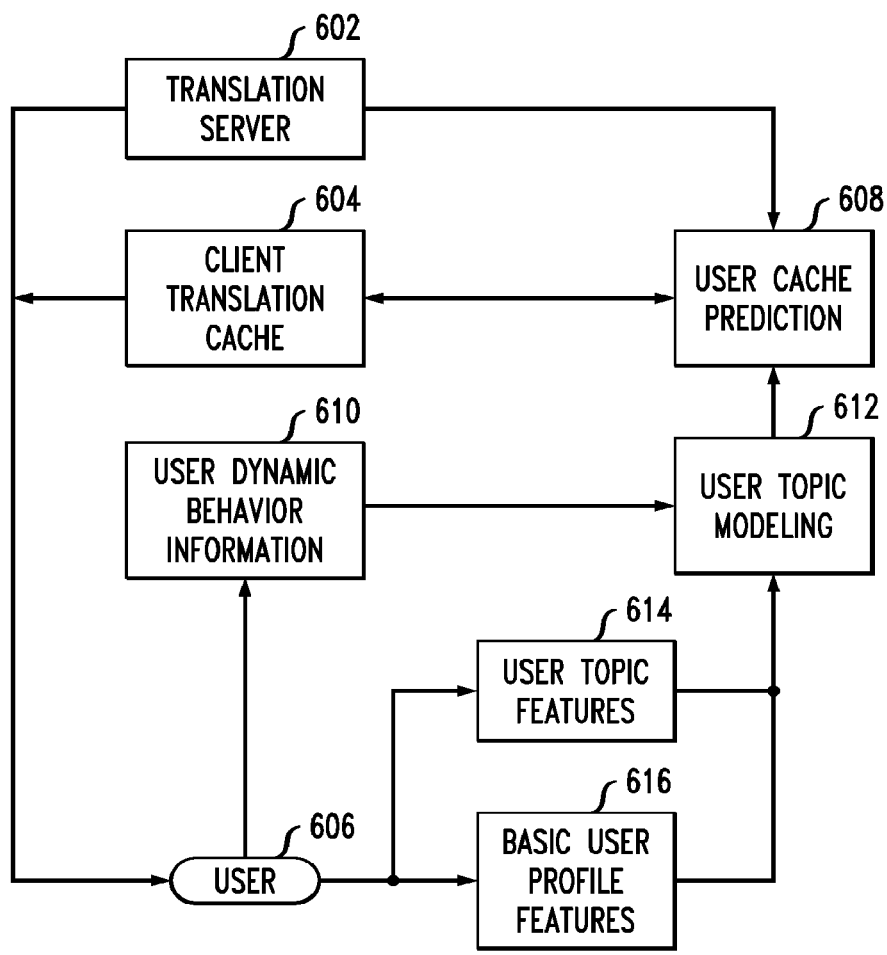
FIG. 6 is a block diagram illustrating example architecture, according to an embodiment of the present invention.

FIG. 6 is a block diagram illustrating example architecture, according to an embodiment of the present invention. By way of illustration, FIG. 6 depicts a translation server 602, a client translation cache 604, a user component 606 and a user cache prediction component 608. Additionally, FIG. 6 depicts a dynamic user behavior information component 610, a user topic modeling component 612, a user topic features component 614 and a basic user profile features component 616.

As depicted, dynamic user behavior information component 610, user topic features component 614, and basic user profile features component 616 receive user data in various forms (such as dynamic behavior information, topic information and user profile information). This information is processed by those components (that is, components 610, 614 and 616) and is passed on to user topic modeling component 612 for overall topic modeling. The predicted topic model is used by user cache prediction component 608 to update the cache.

As illustrated in FIG. 6, one or more embodiments of the invention include dynamic client side translation prediction with personalization. Accordingly, applications can provide a translation and, on start-up, load a cache of probable translation segments. As detailed herein, a client side translation cache can be dynamically updated, and updates can be at different granularities (phrases, names, etc.). Further, as depicted in FIG. 6, user-specific metadata can be used for building translation cache. Personalization can be carried out through, for example, topic modeling, user information (user modeling), segment modeling and content modeling based on the type of content being translated (words, names, sentences, etc.).

Figure 7:
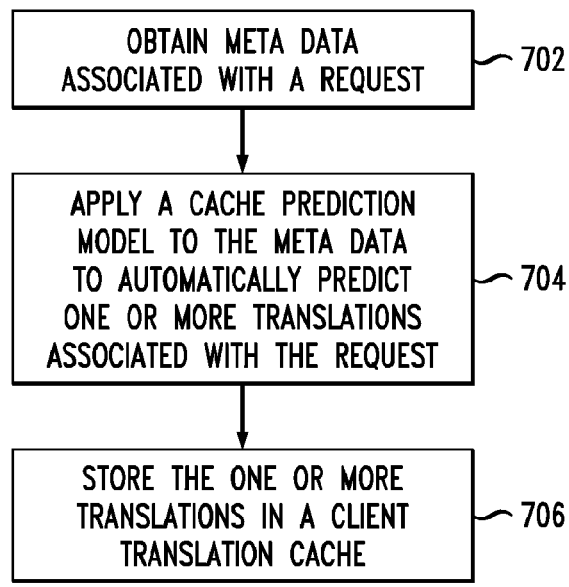
FIG. 7 is a flow diagram illustrating techniques for client side translation cache prediction, according to an embodiment of the invention.

FIG. 7 is a flow diagram illustrating techniques for client side translation cache prediction, according to an embodiment of the present invention. Step 702 includes obtaining meta data associated with a request. This step can be carried out, for example, using a user behavior information component, a user topic features component, and/or a basic user profile features component. The meta data can content for translation, location, a network path, user information, a previous request, language, etc.

Step 704 includes applying a cache prediction model to the meta data to automatically predict one or more translations associated with the request. This step can be carried out, for example, using a cache prediction module. Translations can include one or more translation segments that include words, phrases and colloquial terms. Applying a cache prediction model to the meta data includes using the meta data to automatically predict a topic of translation in which a user is interested, which can additionally include facilitating a determination of frequently requested translations by all users in the given topic.

Step 706 includes storing the one or more translations in a client translation cache. This step can be carried out, for example, using a client translation cache module.

The techniques depicted in FIG. 7 additionally include using user information to generate the cache prediction model. User information can include user behavior information, user topic information, user profile, etc. Also, one or more embodiments of the invention can include performing personalization of the client translation cache. Performing personalization of the client translation cache includes at least one of topic modeling, user modeling, segment modeling and content modeling.

Further, the techniques depicted in FIG. 7 can include enabling a user to dynamically modify the client translation cache to improve prediction accuracy. Modifications or updates to the client translation cache occur at one or more granularities. Also, one or more embodiments of the invention include identifying common translations transmitted to the client side for storage in a client machine. One or more embodiments of the invention can additionally include redirecting an output from the client translation cache to a client machine if a request matches a source side of the cache, as well as loading a cache of one or more probable translation segments upon start-up of a client interface.

The techniques depicted in FIG. 7 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a cache prediction module, a translation server module and a client translation cache module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 8:
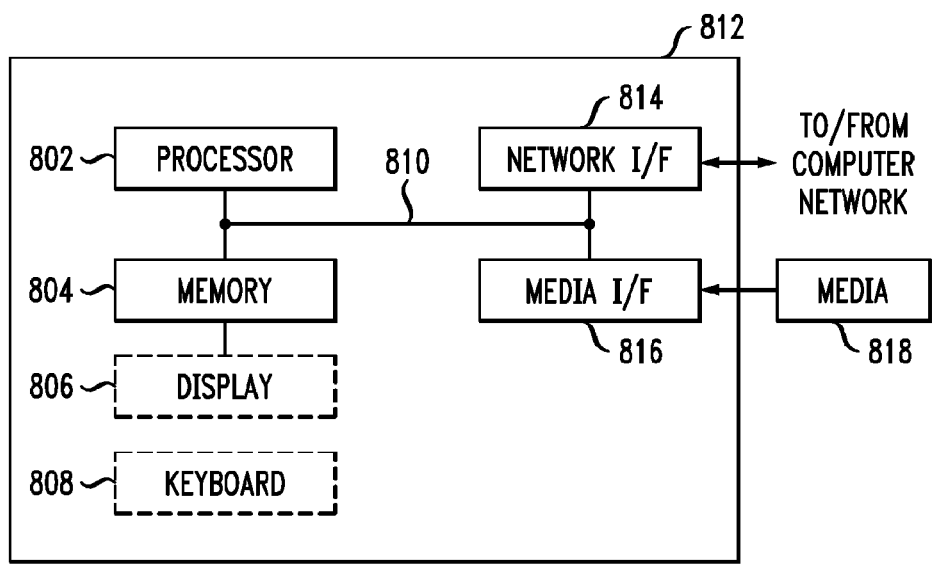
FIG. 8 is a system diagram of an exemplary computer system on which at least one embodiment of the invention can be implemented.

One or more embodiments can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or to device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in the figures and corresponding descriptions herein. The method steps can then be carried out using the distinct software modules and/or sub-modules of the system, as described above, executing on one or more hardware processors 802. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, automated prediction and dynamic modification of user/server cache based on user behavior.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for client-side translation cache prediction, wherein the method comprises:
obtaining meta data associated with a first request via a client-side device;
applying a cache prediction model to the meta data to automatically predict a set of multiple translations associated with the first request by (i) deriving a topic of translation from the meta data, and (ii) determining multiple translations related to said topic of translation;
storing the set of multiple translations in a client-side translation cache of the client-side device; and
loading the set of multiple translations from the client-side translation cache upon obtaining a second request via the client-side device, wherein said second request is related to the topic of translation.

2. The method of claim 1, wherein the meta data comprises at least one of content for translation, location, a network path, user information, a previous request, and language.

3. The method of claim 1, wherein the one or more translations comprise one or more translation segments that comprise at least one of words, phrases and colloquial terms.

4. The method of claim 1, wherein applying a cache prediction model to the meta data further comprises using the meta data to automatically predict a topic of translation in which a user is interested.

5. The method of claim 4, wherein automatically predicting a topic of translation further comprises facilitating a determination of one or more frequently requested translations by all users in the given topic.

6. The method of claim 1, further comprising using user information to generate the cache prediction model.

7. The method of claim 6, wherein user information comprises at least one of user behavior information, user topic information, and user profile.

8. The method of claim 1, further comprising performing personalization of the client-side translation cache.

9. The method of claim 8, wherein performing personalization of the client-side translation cache comprises at least one of topic modeling, user modeling, segment modeling and content modeling.

10. The method of claim 1, further comprising enabling a user to dynamically modify the client-side translation cache to improve prediction accuracy.

11. The method of claim 10, wherein modifications to the client-side translation cache occur at one or more granularities.

12. The method of claim 1, further comprising identifying one or more common translations transmitted to the client-side for storage in a client machine.

13. The method of claim 1, further comprising redirecting an output from the client-side translation cache to a client machine if a request matches a source side of the cache.

14. The method of claim 1, wherein said loading comprises loading the cache upon start-up of a client interface.

15. The method of claim 1, further comprising providing a system, wherein the system comprises one or more distinct software modules, each of the one or more distinct software modules being embodied on a tangible computer-readable recordable storage medium, and wherein the one or more distinct software modules comprise a cache prediction module, a translation server module and a client-side translation cache module executing on a hardware processor.

16. A computer program product comprising a tangible computer readable recordable storage medium including computer useable program code for client-side translation cache prediction, the computer program product including:
computer useable program code for obtaining meta data associated with a first request via a client-side device;
computer useable program code for applying a cache prediction model to the meta data to automatically predict a set of multiple translations associated with the first request by (i) deriving a topic of translation from the meta data, and (ii) determining multiple translations related to said topic of translation;
computer useable program code for storing the set of multiple translations in a client-side translation cache of the client-side device; and
computer useable program code for loading the set of multiple translations from the client-side translation cache upon obtaining a second request via the client-side device, wherein said second request is related to the topic of translation.

17. The computer program product of claim 16, further comprising computer useable program code for using user information to generate the cache prediction model, wherein user information comprises at least one of user behavior information, user topic information, and user profile.

18. The computer program product of claim 16, further comprising computer useable program code for performing personalization of the client-side translation cache, wherein the computer useable program code for performing personalization of the client-side translation cache comprises computer useable program code for performing at least one of topic modeling, user modeling, segment modeling and content modeling.

19. The computer program product of claim 16, further comprising computer useable program code for enabling a user to dynamically modify the client-side translation cache to improve prediction accuracy.

20. The computer program product of claim 16, further comprising computer useable program code for identifying one or more common translations transmitted to the client-side for storage in a client machine.

21. A system for client-side translation cache prediction, comprising:
a memory; and
at least one processor coupled to the memory and operative to:
obtain meta data associated with a first request via a client-side device;
apply a cache prediction model to the meta data to automatically predict a set of multiple translations associated with the first request by (i) deriving a topic of translation from the meta data, and (ii) determining multiple translations related to said topic of translation;
store the set of multiple translations in a client-side translation cache of the client-side device; and
load the set of multiple translations from the client-side translation cache upon obtaining a second request via the client-side device, wherein said second request is related to the topic of translation.

22. The system of claim 21, wherein the at least one processor coupled to the memory is further operative to use user information to generate the cache prediction model, wherein user information comprises at least one of user behavior information, user topic information, and user profile.

23. The system of claim 21, wherein the at least one processor coupled to the memory is further operative to perform personalization of the client-side translation cache, wherein performing personalization of the client-side translation cache comprises at least one of topic modeling, user modeling, segment modeling and content modeling.

24. The system of claim 21, wherein the at least one processor coupled to the memory is further operative to enable a user to dynamically modify the client-side translation cache to improve prediction accuracy.

25. The system of claim 21, wherein the at least one processor coupled to the memory is further operative to identify one or more common translations transmitted to the client-side for storage in a client machine.

* * * * *